Dec. 25, 1951     O. E. SORENSEN     2,579,521
PINKING SHEARS AND METHOD OF MANUFACTURING SAME
Filed March 12, 1946     5 Sheets-Sheet 1

INVENTOR.
Otto E. Sorensen,
BY
Attorney.

Dec. 25, 1951     O. E. SORENSEN     2,579,521
PINKING SHEARS AND METHOD OF MANUFACTURING SAME
Filed March 12, 1946     5 Sheets-Sheet 2

INVENTOR.
Otto E. Sorensen,
BY

Attorney.

Dec. 25, 1951     O. E. SORENSEN     2,579,521
PINKING SHEARS AND METHOD OF MANUFACTURING SAME
Filed March 12, 1946     5 Sheets-Sheet 3

INVENTOR.
Otto E. Sorensen,
BY
Attorney.

Patented Dec. 25, 1951

2,579,521

UNITED STATES PATENT OFFICE 2,579,521

PINKING SHEARS AND METHOD OF MANUFACTURING SAME

Otto E. Sorensen, Fairfield, Conn.

Application March 12, 1946, Serial No. 653,805

20 Claims. (Cl. 30—230)

This invention relates to pinking shears and to improved methods of manufacturing the same.

It is well understood that pinking shears differ from shears which make an ordinary straight cut by having a configuration of shearing edges which produces in the material being severed a zig-zag shape of cut. Such zig-zag shape of cut inhibits raveling of the severed edge in the woven goods.

The present invention solves a long standing problem of providing satisfactory rake or shearing clearance between the ribbed surfaces of pinking shear blades whose transverse ridges have a profile shape defining the cutting edges of the blades. Since shear blades swing relatively upon a common pivotal axis every point on each of the blades traverses an arc in relation to the other blade. All such arcs are arcs of concentric circles. The arcs nearer the common pivotal axis of the blades are of more abrupt curvature than the arcs near the tips of the blades. These are factors which have given rise to the problem aforesaid of generating mating ridges and grooves in the blade surfaces having successful shearing clearance. It is an object of the invention to insure to all parts of the mating ribbed faces of pinking shear blades a proper degree of rake to produce a good cutting action on a large range of work materials.

The present improvements contemplate a novel shape and disposition of the mating ridges and grooves of the ribbed blade surface based on geometrical principles newly made use of in this art and having as their aim to simplify and economize the mass production of pinking shears as well as to enhance their capacity for almost unlimited resharpening by ordinary shear grinding methods without destroying or impairing any of the original satisfactory cutting performance. My present disclosure further teaches novel ways and means of producing pinking shears having blades whose ribbed mating surfaces are characterized by the above said novel principles of shape and disposition.

A further object is to produce pinking shears having a pair of blades whose aforesaid mating ridges and grooves are capable during the processing of their mating surfaces of coinciding exactly throughout their entire areas whereby each such surface can be lapped throughout by rubbing the whole of such surface against the whole of the mating surface on the companion blade without thereby deviating from the shape imparted to the ridge and groove surfaces prior to their being lapped together.

A further object is to produce pinking shears whose blades have mutually facing ribbed surfaces comprising mating ridges and grooves generated in helical paths and then assembled to swing in planar paths to bring into play the aforementioned cutting rake or clearance therebetween.

A still further object of the invention is to lap the whole of such helical surfaces of the ridges and grooves by rubbing the ribbed faces of the mating blades together while at least one of the blades performs a screw motion relative to the other blade of the pair that are being lapped.

A still further object is to generate arcuate ridges and grooves comprising the transversely ribbed face of a pinking shear blade such that the cutting ends of all ridges along the blade lie in the common plane in which the blade swings during its work cutting movement, even though the row of such cutting ends that extends lengthwise of the blade is not directed radially with respect to the common pivotal axis of the blades, or in other words with respect to the common center of curvature of all the arcuate ridges and grooves.

The foregoing and related objects of the invention will become clear in greater particular from the following description of preferred forms of the improved shears and of methods and of machine tool set-up for successfully producing them, said description having reference to the appended drawings wherein:

In the shearing of sheet materials it is well known that the most favorable cutting action results from a coming together of the shear edges progressively along their lengths. Where the knife edges of a pinking tool approach and pass each other with rectilinear motion, as in a guillotine or plunger type of pinking machine, there is no problem in obtaining successful clearance between the faces of the cutting tool that extend back from the cutting edge because such faces are merely beveled to afford cutting clearance as in the manner of any ordinary shearing punch and die. Neither is there any problem in obtaining cutting clearance between the blade faces of ordinary straight edged hand shears wherein the straight cutting edges swing toward each other about a common pivotal joint. But where serated cutting edges with zig-zag or laterally undulating configuration are swung together about a common pivotal axis, as in pinking shears of the hand held type, the problem of obtaining successful operating clearance between the transversely ribbed mating faces of the blades has proven to be the bane of pinking shear manufacture. All schemes for shaping of the mating ridges and grooves of pinking shear blades, and such methods as have been proposed theretofore for generating their shapes, have so far as I am informed proven wholly unsatisfactory and incompetent attempts to solve the problem. Pinking shears as heretofore known in this art have not proven dependable in performance on a wide range of materials, nor capable of being shapened by the mere skill and equipment of an ordinary scissors grinder, nor possible to produce by low cost mass production methods. The popular demand for a practical household pinking shears at a reasonably low consumer and upkeep cost appears never to have been met.

Since the geometrical principles on which the present improvements in ribbed blade faces are newly based differ entirely from prior proposals for pinking shear construction, certain terms that will be used in explaining the invention will first be defined for a better understanding of the description that follows.

The two broadside surfaces of the relatively thin shear blades which face each other when the shears are closed will be termed the mating ribbed faces of the blades. The cutting edges of the blades are those edges which sever the work by approaching and passing each other in arcs of relative swinging movement. The plane of shearing action is any plane in which the blades move to cut the work. It is a plane that is always perpendicular to the common pivotal axis about which the blades swing.

As a simple way of specifying geometrical principles on which this invention is newly based, the circularly winding course of my improved ribbed blade surface will be compared with the arcuate slope of the flank faces of screw threads and thereby distinguished from a circularly ribbed blade surface that slopes in a planar rather than a winding course. In face the ridges and grooves of the ribbed mating surfaces of my improved shear blade can be made if desired to follow an extraplanar path or course no extent of which conforms to any plane or in other words a course which is stereometric as distinguished from planar whether or not such course be strictly helical. This can be accomplished by screw-like motion or relative movement in rotary and axial directions simultaneously between the work and tool during the process of generating and lapping the ridges and/or grooves. While a helical course is commonly throught of as a winding course that progresses lengthwise of its axis of curvature with a constant pitch, some of the advantages of these improvements are possible to a winding course that is pitched with progressively increasing or decreasing steepness. One essential of the type of course referred to is that no progressive extent of it shall be straight nor contained in or parallel with any plane. So far as I am aware all prior attempts to form alternating ridges and grooves crosswise of a pinking shear blade have proposed that the ribbed face be generated by planar movement between the tool and the blade.

Figure 15:
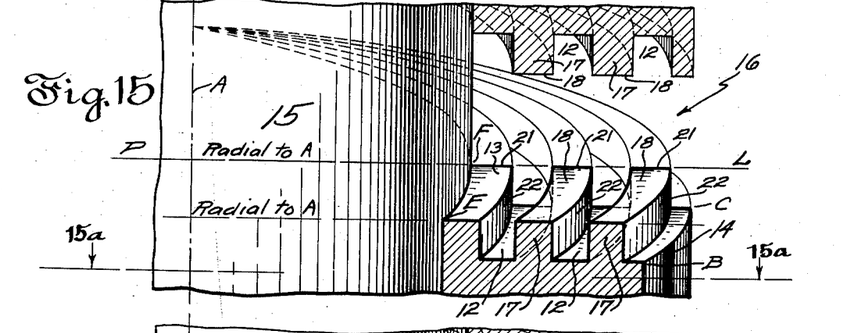
Fig. 15 is a diagrammatic view of a hypothetical screw having the flank surface of its thread grooved to explain certain geometrical principles on which the configurations of the ribbed surfaces of my improved shears are based.
Figure 15A:
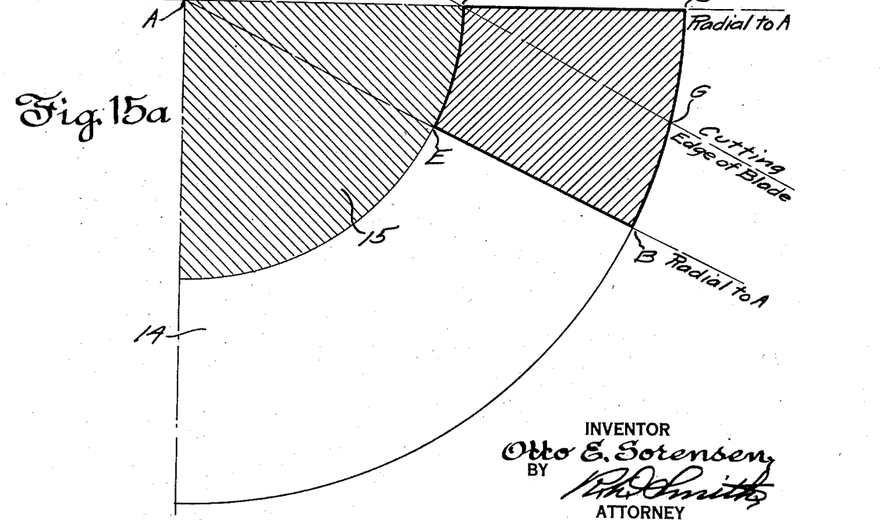
Fig. 15a shows the shape of a section taken on the plane 15a—15a in Fig. 15.

Referring first to Figs. 15 and 15a, we shall distinguish from former practices by considering the path in which a tool would move to generate radially spaced grooves following a helical course such as grooves 12 in the flank surface 13 of the thread or fin 14 which always faces axially as the thread winds about the shank 15 of a square-threaded hypothetical screw 16 having the longitudinal axis A. The cutting out of square grooves 12 leaves between them the square shouldered helically coursing ridges 17. The crest 18 of each ridge 17 is a residual portion of the original flank face 13 of the hypothetical screw thread 14 and the grooves 12 are of uniform profile shape throughout their lengths equalling in depth and width the height and width respectively of ridges 17. Ridges 17 and grooves 12 are of concentric circular contour when viewed axially of the screw. Fig. 15 shows that the helical disposition causes them to follow a course which is exoplanar or digressive throughout from all reference planes that touch upon it, including planes such as P—L that are perpendicular to the axis A of our hypothetical screw 16. P—L will hereinafter be referred to as a work cutting plane or the plane in which either blade in the assembled shears swings relative to its cooperating blade for severing the work.

Figures 1, 1A, 2, 2A, 3, 4, 5, 6, 7:
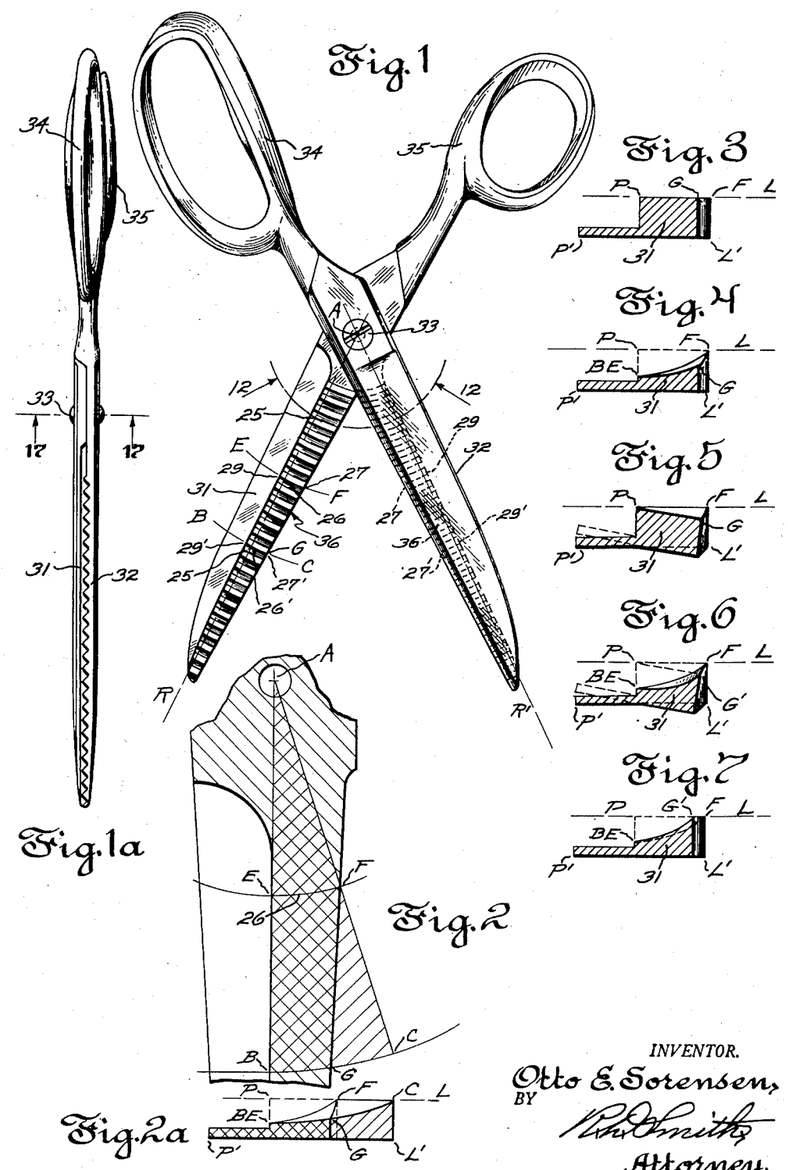
Figs. 1 and 1a are sidewise and edgewise views respectively of pinking shears embodying the present invention.
Figs. 2 and 2a are diagrams explanatory of the reason for skew flexing my improved shear blade in machining it with a multiple toothed single cutting tool.
Figs. 3 to 7, inclusive, are diagrams showing comparative profile shapes of spaced ridges on a single shear blade explanative of the temporary skew flexing of the blades during manufacture.

Were we to cut out of the helically grooved hypothetical screw thread 14 a sectoral portion such as is bounded by F—C—B—E—F in Figs. 2 and 15a, we would find the ridges 17 and grooves 12 terminating in a row of cutting ends 21 extending along the line F—C, which row is radially directed relative to axis A. This row of alternating ridge and groove ends might serve as the undulating cutting edge of the blade of a pinking shears swinging in the plane P—L.

If we so regard this row of ridge ends 21 we see that throughout the circular extent of crests 18 of all the ridges 17 these crests are exoplanar or curved and are digressive throughout their helical course from the plane P—L of their cutting movement and thereby possess throughout their surface areas a rake or cutting clearance with respect to such plane. While no corresponding rake would be possessed by the cylindrical side faces 22 of ridges 17, because such faces are of cylindrical contour containing straight line elements parallel throughout with axis A, a degree of such rake will characterize any other disposition of ridge surface because a surface of any other disposition must be intersectable at some angle by straight lines running parallel with the axis of the hypothetical screw 16.

Figure 16:
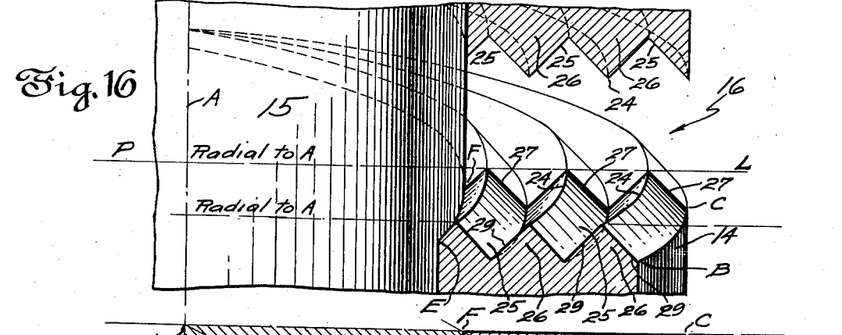
Fig. 16 shows the grooving of the flank surface of the screw thread in Fig. 15 modified to accord with the actual structure of the shear blades shown in Figs. 1 to 11.

Hence, if in place of square grooves 12, we were to cut in the flank 13 of hypothetical screw 16 helical prismatic grooves such as 25 in Fig. 16 leaving therebetween helical prismatic ridges 26 of width, depth and profile shape like that of the grooves, then all the surfaces of such ridges as well as their crests 24 will to some degree face axially of screw 16 and hence, for the reason that has been explained with regard to crests 18, will possess throughout their entire area a rake that affords cutting clearance with respect to the plane of cutting movement P—L of the ridge and groove ends 27.

The rake of the entire surfaces of prismatic ridges 26 in the sector F—C—D—E—F is of a nature that can not be altered nor destroyed by any amount of cutting back of the ridge ends 27 in a direction toward the trailing ends 29 of the same ridges. Hence if these ridges and the grooves between them were to constitute the ribbed surface of a pinking shear blade, no amount of grinding off of the cutting edge of such blade (which would amount to cutting back the ends 27 of the ridges 26) could alter or reduce the angular degree of rake between the shear blades. The present invention therefore newly incorporates in the construction of pinking shears this principle of helically coursing ridges of circularly winding disposition that digress throughout their arcuate course in relation to the plane in which they move to cut the work.

Practical attempts to generate a helically inclined ribbed blade surface by means of a multiple toothed unitary tool have encountered difficulties which also are completely solved by the present improvements, as will next be explained.

Figs. 1 and 1a show a pinking shears composed of two blades 31 and 32 pivotally connected at 33 and equipped with the usual style of ring handles 34 and 35, respectively. Blade 31 has a ribbed face 36 composed of alternating helical ridges and helical grooves like 26 and 25 heretofore referred to in the discussion of Figs. 15, 15a and 16. Fig. 2 is a diagrammatic representation of a portion of blade 31 in the neighborhood of its pivot as viewed in Fig. 1.

In Fig. 2 the area of the aforesaid sector F—C—B—E—F is bounded by radial lines E—B and F—C, intersecting at the pivotal or screw axis A, and by the circular lines B—C and E—F that are described from A as a center. The arcs B—C and E—F also appear on the blade 31 of Fig. 1 to help in identifying their location with respect to actual blade structure. Arc E—F in Fig. 2 represents the more acute circular curvature of one of the ridges 26 that is relatively near axis A and B—C the less acute circular curvature of ridge 26' that is relatively more distant from axis A.

In Fig. 2a there is diagrammatically represented the fragmentary helical curvatures E—F and B—C of these same two ridges 26 and 26' as viewed when looking toward axis A along the line B—E—A in Fig. 2. If P—L represents the aforesaid cutting plane that is perpendicular to axis A, then Fig. 2a shows that the two cutting ends 27 and 27' of the two ridges 26 and 26', at F and C, respectively, lie in the same cutting plane P—L. The opposite ends of these ridges at E and B will lie in a common plane and be equidistant below plane P—L. That this is so will be apparent by considering the flank 13 of our hypothetical square screw thread 14 of Fig. 15, because in conventional machine practice such a screw thread flank is generated by a straight radial line intersecting and remaining always perpendicular to axis A as it sweeps about and progresses lengthwise of said axis. The entire length of this flank generating straight line as it swings about axis A departs to equal increments of distance from a given stationary reference plane P—L as it sweeps in a circularly winding course to generate the flank.

Referring now to actual structure, it follows that if in Figs. 2 and 2a we substitute the shear blade cutting edge F—G for the boundary line A—F—C of our hypothetical screw sector then we find that the cutting end of the ridge 26' at G has dropped below plane P—L to the position G in Fig. 2a. We are now left with a row F—G of cutting ends 27 between a ridge 26 at location E—F and a ridge 26' at location B—G which row fails to parallel the aforesaid plane of cutting movement P—L of the shears. I have devised a solution for this condition which is valuable because it permits the use of a unitary multiple toothed cutter to be used to generate the entire ribbed surface of my improved blade without this undesirable ultimate displacement of the row F—G of ridge ends from plane P—L.

Assume Fig. 3 to represent the profile or cross sectional shape of the blade blank 31 along the arc B—C in Fig. 2a before grooves 25 are cut therein to generate its ribbed face. Across this blade blank we will swing the theoretical unitary cutting tool 40 carrying multiple cutter teeth 41 from left to right about axis A in Fig. 8. If tool 40 were thus to be swung in cutting contact with the blade blank in a plane such as P—L perpendicular to axis A, any one of its teeth 41 would traverse a circular planar path. Such path is diagrammatically represented in foreshortened perspective view by the curved line P—L in Fig. 8. But if tool 40 is carried by an internally threaded hub 42 having threaded engagement with a helically threaded stationary tool staff 43, then in swinging toward the right in Fig. 8 for cutting the grooves 25 in the blade blank, all cutter teeth 41 will traverse helically climbing paths represented by the line Y—Y in Fig. 8 as the tool sweeps across the blade. In the latter case, as demonstrated by Fig. 2a, the resultant course of the blade ridge 26' along arc B—G would compare with the resultant course of the blade ridge 26 along arc E—F as the helical line B—G compares with the helical line E—F in Fig. 4. This throws the cutting row F—G of ridge ends 27 in Fig. 4 out of parallelism with the work cutting plane P—L. This would result in the ultimate blade shape of Fig. 9 wherein the height of ridge cutting end 27' is noticeably less than the height of ridge cutting end 27.

Figures 8, 9, 10, 11:
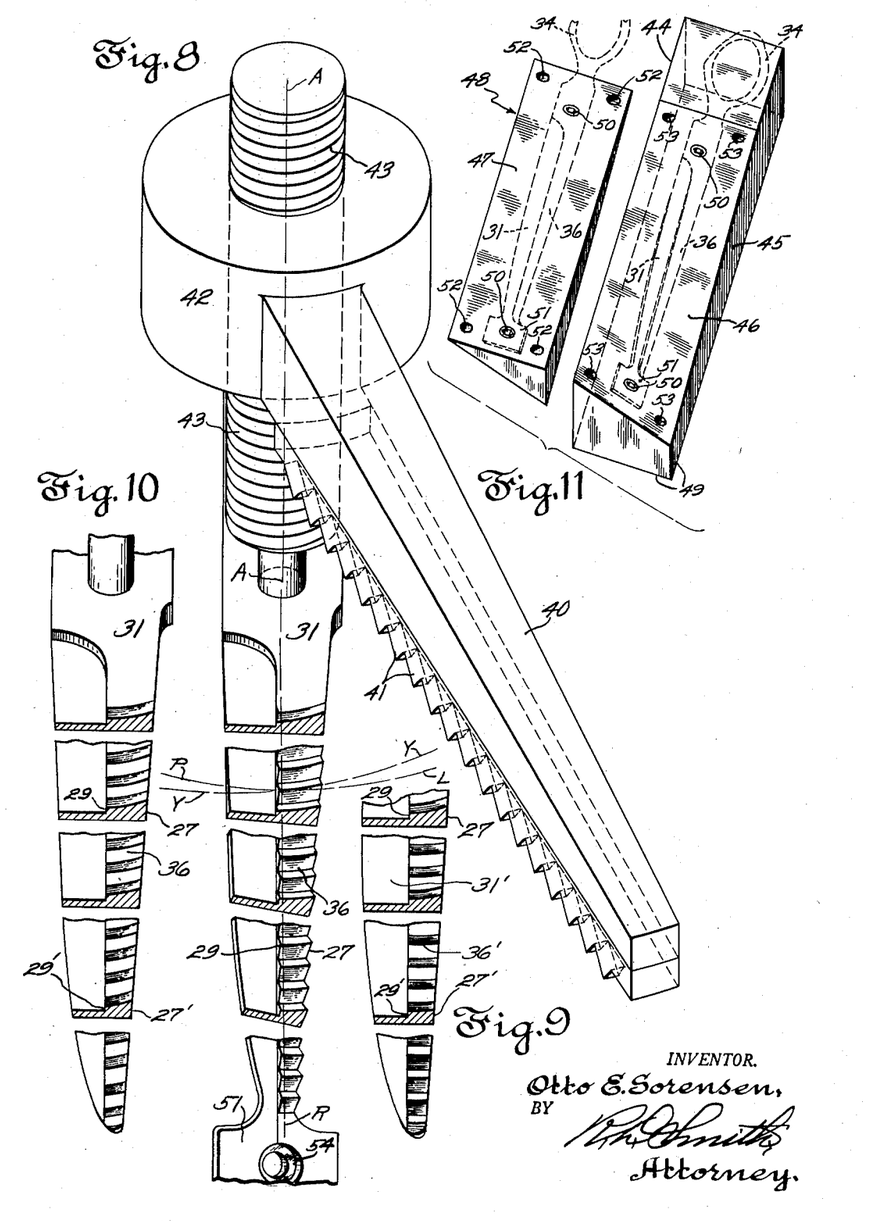
Fig. 8 is a perspective diagrammatic view looking at the ribbed surface of a skew flexed blade with a theoretical tool set-up for generating the ribbed surface thereon, said blade being broken away to exhibit its transverse profile shape at various points in its length.
Fig. 9 shows profile shapes at points corresponding to those in Fig. 8 in a blade that was not skew flexed at the time of generating its ribbed surface.
Fig. 10 shows corrections in the shapes of the blade of Fig. 8 that are attained by skew flexing the blade at the time it is machined.
Fig. 11 is an exploded view of a sectional block that may be used for holding a shear blade optionally in straight or skewed condition while its ribbed face is being generated.

I compensate for this by temporarily distorting the blade blank from its normal flat shape represented in Figs. 3, 4, 7, 9 and 10 to a skew flexed shape represented in Figs. 5, 6 and 8, and on the base section 45 of block 44 in Fig. 11, at least before finishing the helical cutting thereof. This imparts to the ribbed surface of the blade the ultimate desired profile shapes shown crosshatched in Figs. 7 and 10. In further explanation of this result Fig. 6 shows that point G' in the skewed blade is dropped below cutting plane P—L, just as in the case of point G in Fig. 4. Nevertheless when the skew is taken out of the blade, point G', as shown in Fig. 7, rises into coincidence with cutting plane P—L, as do all the cutting ends of all the ridges 26, 26' in row F—G' along the full length of the shear blade. Fig. 10 shows the ridged and grooved blade of Fig. 8 with the skew removed from it and with the cutting ends of all the ridges 26 occupying the same cutting plane P—L thus making the cutting ends 27, 27' of the ridges equal in height throughout the length of the blade.

Skew deformation of the blade during the generation of its ribbed surface for the purpose above explained is distributed over the blade in a manner which does not disturb the alignment of the trailing ends 29 of ridges 26. These ends remain at B—E in their original straight row, nearly aligned with axis A and all lying nearly equidistant from the cutting plane P—L. It follows that the cutting clearance between the ribbed surfaces of the blades tapers from zero at the cutting edge of the blade to an equal maximum extent of clearance at the trailing end of the ridges, as for example at 29 and 29'. See S and S' in Fig. 12.

The correct distribution of the skew distortion of blade 31 along its length may be predetermined experimentally or mathematically or worked out by the science of descriptive geometry. It will be obvious that if in distorting the blade to a flexed or skewed shape, the degree of inclination of the blade lengthwise of block 45 in Fig. 11 while generating the ribbed surface of the blade is made sufficient, then when such distortion is removed from the blade it can result in the assembled shear blades possessing rows of the cutting ends 27, 27', etc. which rows actually toe-in toward each other as they extend from pivot to tip of the blades wherefore to increase the force with which the cutting edges of the shears press against each other as the blades swing to cut work material. It is then set up and fixedly maintained during fabrication of the blade by clamping the blade firmly against a properly contoured work holding face 46 of the base portion 45 of a sectional block 44. This work holding face is skewed or slanted generally cornerwise of the block as roughly indicated in Fig. 11. If desired when initially roughing out the grooves 25, the blade blank may be clamped to a different work holding face 47 of the cap 48 of block 44. Face 47 may be parallel with the bottom or mounting face 49 of the block. Block cap 48 has clearance holes 52 for screws (not shown) that may thread into holes 53 in block section 45 for holding cap 48 thereon.

The amount of skewing of the blade blank is exaggerated in the drawings for purposes of more clearly illustrating the principles involved. It can be such as merely to skew flex the blade as indicated by full lines in Fig. 5, or such as actually to twist the blade as indicated by broken lines in Fig. 5. The blade blank may be held sprung down into conformity with the skewed block surface 46 by means of socket head fastening screws 50 threading into the base section 45 of the block and whose heads are sunk flush in counterbores 54, 61 in the blade blank. This blank includes a temporary lug formation 51 of the blade tip which will be removed after the ribbed face of the blade has been generated permitting the blade tips to be pointed.

Figures 12, 13, 14:
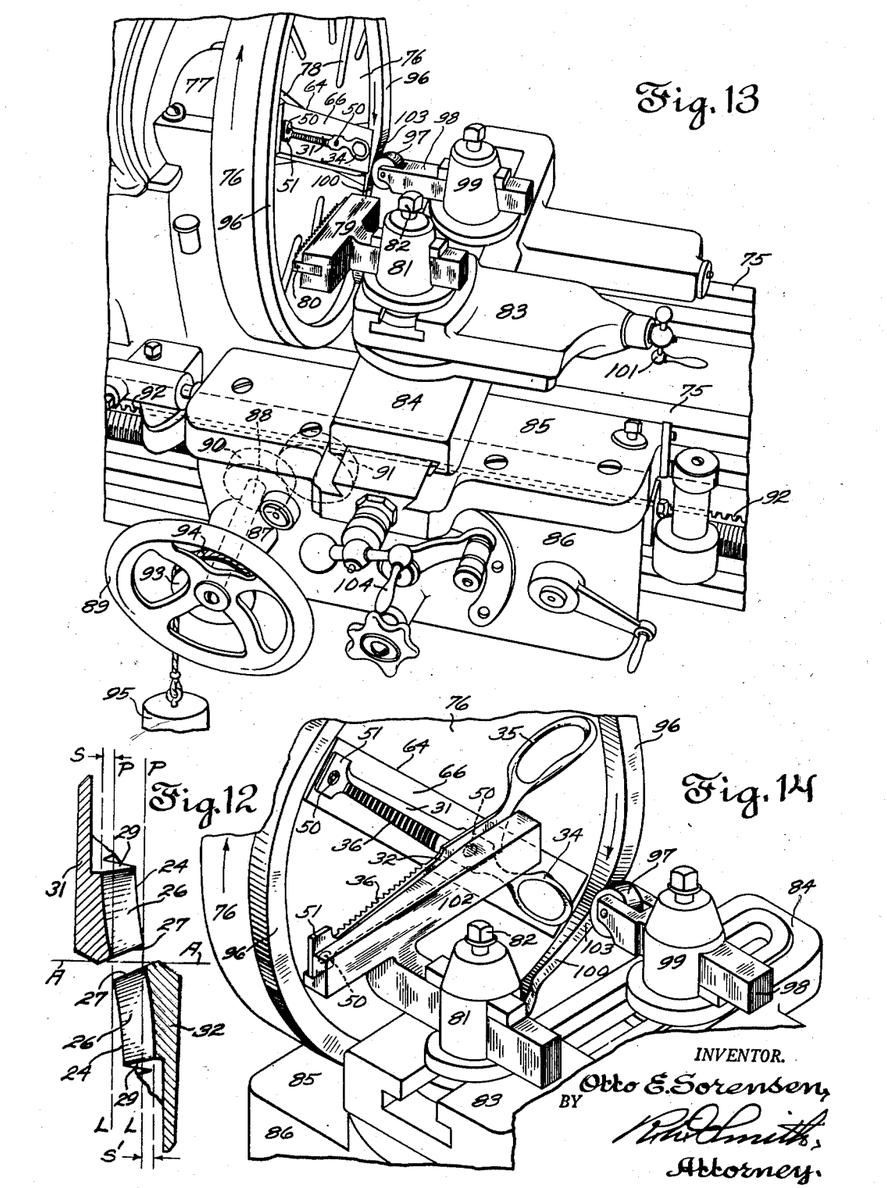
Fig. 12 is an enlarged view taken in section through the cooperative assembled blades on the arcuate line 12—12 in Fig. 1 looking radially toward the common pivotal axis of the blades.
Fig. 13 shows a practical machine tool set-up for generating the ribbed surfaces of the blades illustrated in Figs. 1 to 11.
Fig. 14 is a view like Fig. 13 showing the tool set-up changed for lapping together pre-cut ribbed faces of mating shear blades.

Fig. 12 indicates on an enlarged scale the adequate cutting clearances S and S' that result between the whole areas of the mating ribbed faces of my improved blades, a clearance that aggregates the dimensions S plus S' in Fig. 12, it being understood that the cutting ends 27 of corresponding ridges 26 and grooves 25 of the two blades approach and pass in directions of relative movement paralleling the cutting plane P—L, but that the trailing ends 29 and 29' of these ridges and grooves never pass the trailing ends of the corresponding grooves and ridges 25, 26 of the other blade because the blades are prevented by mutual abutment of their handle portions from swinging closed beyond a point where the radial lines A—R and A—R' coincide. It will be further evident from Fig. 12 that no matter how much the cutting edge, composed of ridge ends 27 of one or both blades, is ground back in resharpening the shears by ordinary scissors sharpening methods there remains always the same angular degree of rake and cutting clearance between all surfaces of the ridges 26 and all surfaces of the grooves 25 throughout the mating ribbed faces of the blades.

Figure 17:
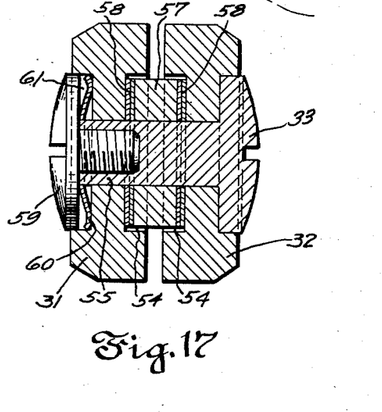
Fig. 17 is a greatly enlarged view taken in section on the plane 17—17 in Fig. 1 showing pivot construction.
Figure 18:
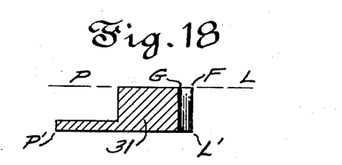
Figs. 18 and 22, inclusive, show modifications of blade profiles in respective comparison with Figs. 3 to 7, inclusive.
Figure 19:
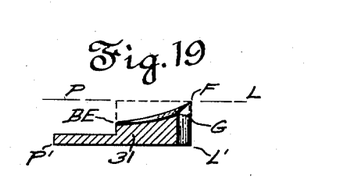
Figure 20:
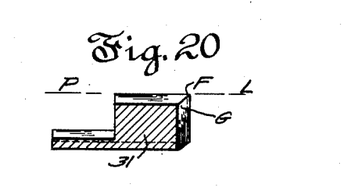

The blades may be adjusted a little more closely to each other at their pivotal axis A if required after repeated resharpening. There are many well known ways in which this can be done, Fig. 17 illustrating a conventional blade pivot construction permitting this. Here the shank 55 of a pivot screw 33 snugly fits concentric pivot holes in the blades which are separated by a spacer collar 57 flanked by removable shim washers 58. A thrust screw 59 threads into shank 55 and imprisons a cupped spring washer 60 in counterbore 61. Spring 60 urges the blades toward each other so that their cutting edges are pressed constantly together as they meet and sever the work material. If so much resharpening occurs that the blades cease thus to rub progressively against each other throughout the length of their cutting edges, the pivot construction shown in Fig. 17 affords a means for increasing the mutual closeness of the ribbed faces 36 of the blades by merely removing screw 59 and taking out one or more of shims 58. To lessen friction in the shear action I may introduce any conventional axial thrust type of ball bearing in place of the shims 58 or of spacer collar 57 and/or between blade 32 and the head 33 of pivot screw 56.

Figs. 18 to 23 illustrate a modified way and means to establish in a common plane perpendicular to axis A a row of work cutting ridge ends 27, 27' etc., where such row is nonradial with respect to axis A as is the case with line F—G in Fig. 2. But this modified method throws the row E—B of trailing ends 29, 29' etc. out of parallelism with the cutting plane P—L in a direction that produces in the finished blade more aggregate cutting clearance between the trailing ends of a ridge and its mating groove at position 29 (position E in Fig. 2) than exists between the trailing ends of a ridge and its groove at position 29' (position B in Fig. 2). Why this is so will become evident from the following discussion of the modification referred to.

Figure 21:
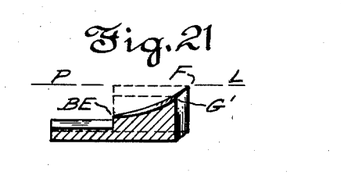
Figure 22:
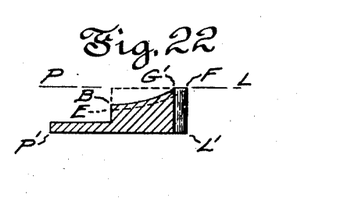
Figure 23:
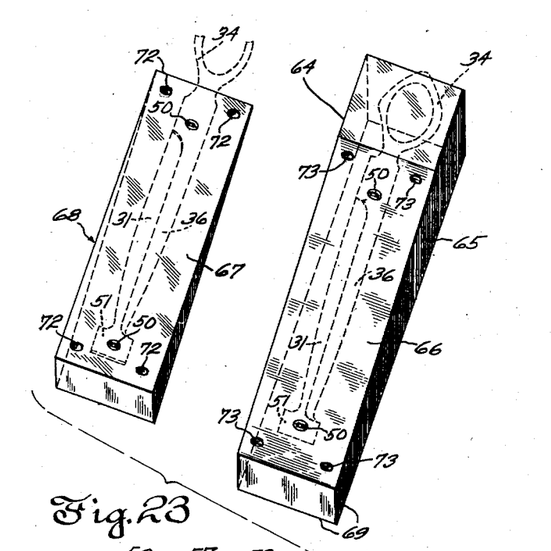
Fig. 23 shows a correspondingly modified shape of work holding block for comparison with Fig. 11.

The deformation imparted to the blade in this modification involves no skew flexing nor twisting of the blade but consists merely in a broadside bending, or bowing over downward, of the length of the blade as indicated in Figs. 21 to 23. Fig. 21 shows that this can have the same effect on the row F—G' of cutting ends of the ridges as was the case in Fig. 6. But Fig. 21 further shows that the blade blank has here become inclined lengthwise of the row B—E of trailing ends of the ridges so that when the bend is taken out of the blade for the purpose of restoring the row G'—F of cutting edges into coincidence with cutting plane P—L, the row B—E of trailing ends correspondingly tilts upward into relation to said plane as is indicated by the vertical separation of points B and E in Fig. 22. This results in the cutting clearance between the ribbed surfaces of the blades becoming unequal at the trailing ends of the ridges. In other words the trailing end of a ridge at position 29 (position E in Fig. 2) will have more clearance with respect to its mating groove than will the trailing end of a ridge at position 29' (position B in Fig. 2). The reason for this varying clearance at the trailing ends of the ridges will become apparent by comparing Figs. 18 to 23 with Figs. 3 to 7, respectively.

This modified but more simple bending or bowing of the blade in Fig. 23 will be fixedly maintained during the cutting and lapping of its ribbed surface by clamping the blade firmly against a properly slanted work holding face 66 of the base portion 65 of a sectional block 64 shown in Fig. 23. This work holding face is simply slanted lengthwise of the block in contrast to the cornerwise slanting of face 46 in Fig. 11. As in Fig. 11 when initially roughing out the grooves 25, the blade blank if desired may be clamped to a different work holding face 67 on the cap 68 of block 64, face 67 being parallel with the bottom or mounting face 69 of the block. Block cap 68 contains clearance holes 72 for screws (not shown) that may thread into holes 73 in block section 65 for holding cap 68 thereon.

Figs. 13 and 14 show an exemplary machine tool set-up that is available to any moderately equipped machine shop and that is capable of carrying out the methods of this invention and producing blades of pinking shears incorporating the present inventive improvements. In these figures, 75 represents the ways of a conventional lathe whose power-rotated face plate 76 is fastened to the spindle of the lathe (not shown) that is journaled in the head stock bearing 77. By any suitable means such as the usual work clamping straps (not shown) whose fastening bolts may penetrate the slots 78 in face plate 76 and engage nuts in the rear thereof to draw the straps against the block 44, this block or block 64 of Figs. 11 or 23 may be secured to face plate 76 with the block face 49 or 69 resting flatly thereagainst. The block length is disposed in diametrical alignment with the axis of rotation of the face plate and so that the pivotal axis A of the blade that is central of blade counterbore 54 coincides with the center of rotation of the face plate. The center of counterbore 51 of the blade blank will then be exactly on a diametrical line passing through the center of rotation of the face plate. In other words the line A—R of the blade blank of Fig. 8 will lie diametrically of the face plate.

A practical equivalent of the theoretical tool 40 of Fig. 8 may then be provided by the T-shaped holder 79 for the gang tooth tool 80 whose cutting teeth will be arranged and do the work of theoretical tool teeth 41 in Fig. 8. Holder 79 is rigidly held in a conventional lathe tool post 81 in the usual removable manner by tightening set screw 82 with a wrench when cutter 80 is so aligned that its row of cutting teeth is exactly parallel to the flat surface of face plate 76 and the cutting ends of its teeth lie in straight row exactly diametrically disposed with respect to the axis of rotation of the face plate. Tool post 81 is supported on the usual sub-rest 83 atop the cross carriage 84 that rides with the main carriage 85 on lathe ways 75 toward and away from the face plate. Carriage 85 has a front apron 86 providing a bearing 87 for the coarse-feed shaft 88 on whose front end is fixed the hand wheel 89 and on whose rear end is fixed a spur gear 90 in mesh with another spur gear 91 which in turn meshes with the teeth 92 of the usual downfacing rack that is stationed on the bed of the lathe just beneath its ways 75. A pulley 93 just back of hand wheel 89 and fixed to the latter serves as a drum on which is wound the cord 94 from whose free end is suspended the carriage feeding weight 95 which constantly urges carriage 85 and the tool 80 toward the face plate 76 in Figs. 13 and 14. The extent to which the tool 80 can advance toward the blade blank 31 on the block 44 is determined by an annular rim cam 96 bordering and fixed on face plate 76. This cam is constantly engaged by a pilot roller 97 that is rotatably carried by a bar 98 that is removably secured in an auxiliary tool post 99 fixed on the main carriage 85.

In the rim cam 96 there is a depression 100 so located circumferentially as to let tool 80 advance toward the face plate into cutting contact with the blade blank 31 just as the latter approaches and is about to pass tool 80. This tool thereby performs a cut in the revolving blade blank and will generate the ribbed surface 36 on the latter. The geometrical course of that cut is determined by the rising surface 103 in cam depression 100 when face plate is rotating in the direction of the arrow. If surface 103 defines a helical course, the course of all ridges and grooves in the ribbed surface of the shear blade will be helical. The depth of the tool cut may be small on the first revolution of the blade and may be increased at each revolution thereafter until a maximum depth of cut is ultimately predetermined by manually feeding the sub-rest 83 toward the face plate relative to the cross carriage 84. This is done under fine control by means of the conventional micrometer feed screw (not shown) that runs lengthwise of the sub-rest and is turned by the feed handle 101. At all points during the revolution of the blade other than when it is passing the cutting tool to be grooved thereby, roller 97 will ride on the highest surface of rim cam 96 and thus thrust the main carriage 85 away from face plate 76 by overcoming the urge of weight 95. This gives the ring handle 34 or 35 of the shear blade ample room to pass the cutting tool without interference. Both blades 31 and 32 will have their ribbed surfaces generated in this same way, the only difference being that the tool 80 will be shifted a ½ ridge distance by means of cross-carriage feed handle 104 for cutting blades 31 and 32 in order that the ridges on one blade may mate with the grooves in the other blade.

In Fig. 14 there is shown to be substituted for the cutting tool 80 a shear blade 32 which has its ribbed surface 36 previously generated therein. This is for lapping together two mating blades that are to be assembled into the same pair of shears. The stationary blade 32 will be firmly mounted on a special holder 102 in the same way that it was previously mounted on a block like 44 or 64 when cutting its ribbed blade surface. The pivot hole of blade 32 will be aligned exactly coaxially with the pivot hole of blade 31. If the ribbed surfaces of the blades were generated while the blades were skew flexed as in Fig. 8, blade 32 will be held correspondingly distorted on a holder 102 having its face slanted like the surface 46 of block base 45 in Fig. 11. If the ribbed blade surfaces were generated with the blade merely bent down lengthwise as at the right of Fig. 23, then the blade 32 for purposes of lapping will be mounted on a holder 102 having its blade holding face slanted like face 66 of the block base 65. Screws like 50 will secure blade 32 to holder 102 so that by feeding up the blade 32 by means of screw handle 101 it can be caused to rub against blade 31 with a pressure force exerted by weight 95. The cam 96 may come into play to limit movement of blade 32 toward the face plate 76 when blade 31 is not taking the thrust of blade 32. Lapping compound may be used.

Since the ribbed surfaces of both blades mutually conform like the threads of a nut fitting the threads of its bolt, it proves out in practice that the full surface of each ridge 26 wipes against the full surface of its mating groove in the companion blade so that there is accomplished a full surface lapping of the whole length and area of each ridge and groove throughout the whole length and area of the ribbed surfaces of both blades while one blade is undergoing movement relative to the other in a helical course. When a sufficiently fine surface is obtained in the original forming of the grooves the subsequent lapping operation described in the foregoing may be omitted. It will further be realized that recourse to distorting or flexing the blade during generation of its ribbed surface is not an essential where a gang cutter with relatively fixed teeth is not used as the groove forming tool. For example, if all but one of the cutter teeth 41 on tool 80 are omitted all the grooves may be cut successively by this single remaining tool tooth 41 when the latter is stepped back or forth successively along the blade length and with respect to the face plate center by shifting the cross carriage 84 by means of its feed screw handle 104.

While for purposes of explanation the shape of blade profile is diagrammatically indicated as providing a flat back in Figs. 3 to 10, and 18 to 22, the preferred shape of profile in the finished blade is more like that shown in Fig. 12. It will be realized that no portion of any surface of any of the ridges such as 26 or 26' is flat.

With this understanding of the many departures in shape and arrangement of parts that may embody the underlying principles of this invention the appended claims are directed to and intended to cover all substitutes and variations of the herein illustrated and described forms of the invention which fairly come within a broad interpretation of the claim language.

I claim:

1. Pinking shears embodying in combination, blades pivotally coupled together in a manner to swing relatively about a common pivotal axis, and having cooperative cutting edges and ribbed mutually facing surfaces, each of said ribbed surfaces comprising ridges and grooves whose ends combine to define the cutting edge of the blade and whose lengths extend from said cutting edge crosswise of the blade in paths so curved that no extent of any said path is contained within a plane.

2. Pinking shears embodying in combination, blades pivotally coupled together in a manner to swing relatively about a common pivotal axis, and having cooperative cutting edges and ribbed mutually facing surfaces, at least one of said ribbed surfaces comprising ridges and grooves no portion of whose surfaces are flat and whose ends combine to define the cutting edge of the blade and whose entire lengths extend from said cutting edge crosswise of the blade and all portions of whose surfaces are of stereometric curvature throughout.

3. Pinking shears embodying in combination, blades pivotally coupled together in a manner to swing relatively about a common axis, said blades having cooperative cutting edges and ribbed mutually facing broadside surfaces, each of said ribbed surfaces comprising ridges and grooves ending at the cutting edge of the blade and extending from said cutting edge crosswise of the blade in a helical course.

4. Pinking shears embodying in combination, blades pivotally coupled together in a manner to swing relatively about a common axis, said blades having cooperative cutting edges and mutually facing ribbed surfaces, at least one of said ribbed surfaces comprising ridges and grooves whose ends define the cutting edge of the blade, and all of said ridges and grooves extending in helical courses throughout their length from their said ends crosswise of the blade.

5. Pinking shears embodying in combination, blades pivotally coupled together in a manner to swing relatively about a common axis, said blades having cooperative cutting edges and mutually facing broadside surfaces ribbed crosswise of the blade and bordering respectively at said cutting edges, at least one of said ribbed surfaces progressing crosswise of its blade in helical paths.

6. Pinking shears embodying in combination, blades pivotally coupled together in a manner to swing relatively about a common axis, said blades having cooperative cutting edges and mutually facing broadside surfaces ribbed crosswise of the blade and bordering respectively at said cutting edges, the contour of at least one of said ribbed surfaces conforming to a series of concentric helices.

7. Pinking shears embodying in combination, blades coupled together to swing relatively about a common pivotal axis, said blades having cooperative cutting edges and mutually facing surfaces each extending along its blade and bordering at the cutting edge thereof, at least one of said surfaces containing ridges and grooves traversing said blade in concentric extraplanar paths with respect to said common pivotal axis of the blades.

8. Pinking shears embodying in combination, blades pivotally coupled together in a manner to swing relatively about a common pivotal axis, said blades having cooperative cutting edges and ribbed mutually facing surfaces, each of said ribbed surfaces comprising ridges and grooves ending at the cutting edge of the blade and extending from said cutting edge crosswise of the blade in a course that curves digressively from all reference planes touching said course, the entire surfaces of the said ridges and grooves being of curved contour in all directions other than a direction truly radial to said pivotal axis.

9. Pinking shears embodying in combination, blades coupled together to swing relatively about a common pivotal axis, said blades having cooperative cutting edges and mutually facing surfaces each extending along its blade and bordering at the cutting edge thereof, at least one of said surfaces containing ridges and grooves traversing said blade in concentric circular paths pitched like screw threads with respect to said common pivotal axis of the blades, the cutting edge of at least one of said blades being substantially displaced from a line truly radial to the said common pivotal axis of the said blades.

10. Pinking shears embodying in combination, blades coupled together to swing relatively about a common pivotal axis, said blades having cooperative cutting edges and mutually facing surfaces each extending along its blade and bordering at the cutting edge thereof, at least one of said surfaces containing ridges and grooves traversing said blade in concentric circular paths pitched like screw threads with respect to said common pivotal axis of the blades, and at least one of the said cutting edges comprising a straight row of serrations, said straight row being substantially displaced from a line truly radial to the said common pivotal axis of the said blades.

11. Pinking shears embodying in combination, blades pivotally coupled together in a manner to swing relatively about a common pivotal axis and having cooperative cutting edges and ridged mutually facing surfaces, each of said ridged surfaces comprising ridges and grooves whose ends combine to define the cutting edge of the blade and whose lengths extend from said cutting edge crosswise of the blade in paths so curved that no extent of any said path is contained within a plane, the entire surfaces of said ridges and grooves being intersectable by straight lines running parallel with the said pivotal axis.

12. The method of making pinking shears composed of two blades pivotally coupled together to swing relatively about a common axis, which includes the steps of, forming mating ridges and grooves side-by-side in helical courses with respect to said axis crosswise of each of said blades, and lapping simultaneously together the mating surfaces of all of said ridges and grooves by moving at least one of said blades with a screw-like movement relatively to the other blade while said mating surfaces are wipingly pressed together.

13. The method of making pinking shears which includes the steps of, forming flat surfaces on a pair of cooperative blades, deflecting at least one of said blades in a manner to flex the flat surface thereon into exoplanar shape, causing the flexed surface on at least one of said blades to be traversed with screw-like motion by a surface ribbing tool having multiple fixed cutting teeth, restoring said blade to its original shape, and pivotally coupling said blades together with the tool ribbed surfaces facing each other and in a manner restricting said blades to relative shearing movement in parallel planes.

14. The method of making pinking shears which includes the steps of, forming flat surfaces on a pair of cooperative blades, deflecting at least one of said blades in a manner to flex the flat surface thereon into exoplanar shape, causing the flexed surface on at least one of said blades to be traversed in a helical course by a surface ribbing tool having multiple fixed cutting teeth, restoring said blade to its original shape, and pivotally coupling said blades together with the tool ribbed surfaces facing each other and in a manner restricting said blades to relative shearing movement in parallel planes.

15. The method of making pinking shears which includes the steps of, forming a broadside surface on each of a pair of cooperative cutting blades, ribbing the broadside surface of each of said blades by screw-like motion between said surface and a ribbing tool, rubbing the ribbed surfaces of said blades together with screw-like motion in the presence of an abrasive to cause said surfaces mutually to lap each other, and pivotally coupling said blades together with said ribbed surfaces facing each other and in a manner restricting said blades to relative shearing movement in parallel planes thereby to produce cutting clearance between said ribbed surfaces.

16. The method of making pinking shears which includes the steps of, forming elongated broadside surfaces on a pair of cooperative cutting blades, grooving side-by-side channels crosswise in said broadside surfaces by relative movement in rotary and axial directions simultaneously between at least one of said broadside surfaces and a grooving tool in cutting engagement therewith thereby to convert at least one of said broadside surfaces into a ribbed surface that slopes in a circularly winding course, and pivotally coupling said blades together with said ribbed surfaces facing each other and in a manner restricting said blades to relative shearing movement in parallel planes with respect to which at least one of said ribbed surfaces windingly slopes thereby to produce cutting clearance between said ribbed surfaces.

17. The method of making pinking shears which includes the steps of, forming broadside surfaces on a pair of cooperative cutting blades, grooving side-by-side channels crosswise in said broadside surfaces by relative movement in a helical course between at least one of said broadside surfaces and a grooving tool in cutting engagement therewith thereby to convert at least one of said broadside surfaces into a ribbed surface that slopes in a circularly winding course, and pivotally coupling said blades together with said ribbed surfaces facing each other and in a manner restricting said blades to relative shearing movement in parallel planes with respect to which planes at least said one of said ribbed surfaces slopes thereby to produce cutting clearance between said ribbed surfaces.

18. The method of making pinking shears which includes the steps of, forming a ribbed surface incorporating side-by-side helically coursing ridges on each of a pair of cooperative blade blanks, pivotally coupling said blades together with said ribbed surfaces facing each other, and restricting the relative cooperative shearing movement of said surfaces to parallel planar paths with respect to which said helically coursing ridges are constantly inclined thereby to produce cutting clearance between said ribbed surfaces.

19. The method of making pinking shears composed of two blades coupled together to swing relatively about a common pivotal axis, which includes the steps of, revolving at least one of said blades about said pivotal axis, cutting grooves which in at least said one of said blades wind about said axis with axial pitch like the course of a screw thread, forming ridges on the other of said blades in courses to conform and mate respectively with said grooves, and assembling said blades in a manner confining them to cooperative relative swinging movement in planes perpendicular to said pivotal axis with respect to which planes said grooves and ridges are inclined thereby to produce and maintain cutting clearance between said surfaces.

20. The method of making a pinking shear blade which includes the step of revolving said blade about a pivotal axis and cutting grooves in the surface of said blade which wind about said axis with axial pitch in the manner of a screw thread, whereby ridges are left which separate said grooves and also wind about said axis with axial pitch in the manner of a screw thread.

OTTO E. SORENSEN.

REFERENCES CITED

The following references are of record in the file of this patent:

UNITED STATES PATENTS

| Number | Name | Date |
| --- | --- | --- |
| 1,959,190 | Wyner et al. | May 15, 1934 |
| 2,286,874 | Schwartz | June 16, 1942 |
| 2,387,053 | Brown | Oct. 16, 1945 |
| 2,395,897 | Kethcart | Mar. 5, 1946 |